United States Patent [19]
Yamauchi et al.

[11] Patent Number: 5,096,549
[45] Date of Patent: Mar. 17, 1992

[54] DEHUMIDIFIER AND METHOD OF USING

[75] Inventors: Shiro Yamauchi; Kenichi Mori; Eiichi Nagao; Koichi Hirooka, all of Amagasaki, Japan

[73] Assignee: Mitsubishi Denki Kabushiki Kaisha, Japan

[21] Appl. No.: 552,850

[22] PCT Filed: Aug. 6, 1987

[86] PCT No.: PCT/JP87/00589
§ 371 Date: Jan. 6, 1989
§ 102(e) Date: Jan. 6, 1989

[87] PCT Pub. No.: WO88/08742
PCT Pub. Date: Nov. 17, 1988

[30] Foreign Application Priority Data

| Mar. 8, 1987 | [JP] | Japan | 62-110617 |
| May 19, 1987 | [JP] | Japan | 62-120114 |
| May 19, 1987 | [JP] | Japan | 62-120115 |
| May 25, 1987 | [JP] | Japan | 62-125932 |

[51] Int. Cl.$^5$ .................... C25B 1/02; C25B 1/04
[52] U.S. Cl. .................... 204/129; 204/130; 204/265; 204/266; 204/295; 204/292; 204/293; 204/228; 204/231; 236/44 A; 236/44 E
[58] Field of Search ........... 236/44 E, 44 R, 44 A; 204/130, 131, 152, 263, 264, 266, 265, 269, 290, 283, 267, 296

[56] References Cited

U.S. PATENT DOCUMENTS

| 4,024,036 | 5/1977 | Nakamura et al. | 204/295 |
| 4,332,663 | 6/1982 | Berneke | 204/278 |
| 4,457,822 | 7/1984 | Asano et al. | 204/252 |
| 4,457,823 | 7/1984 | LaConti et al. | 204/282 |
| 4,498,942 | 2/1985 | Asano et al. | 156/151 |
| 4,528,078 | 7/1985 | Hirschfeld | 204/283 |

FOREIGN PATENT DOCUMENTS

| 0026577 | 4/1981 | European Pat. Off. . |
| 1589429 | 2/1975 | Fed. Rep. of Germany . |
| 439646 | 4/1943 | Japan . |
| 52-46098 | 11/1977 | Japan . |
| 56-48220 | 5/1981 | Japan . |
| 59-212651 | 12/1984 | Japan . |
| 60-36947 | 2/1985 | Japan . |
| 60-114325 | 6/1985 | Japan . |
| 61-18855 | 1/1986 | Japan . |
| 61-181520 | 8/1986 | Japan . |
| 61-188855 | 8/1986 | Japan . |
| 61-216714 | 9/1986 | Japan . |
| 1186541 | 2/1967 | United Kingdom . |

Primary Examiner—John Niebling
Assistant Examiner—Kathryn Gorgos
Attorney, Agent, or Firm—Leydig, Voit & Mayer

[57] ABSTRACT

A dehumidifier for removing moisture from a gas containing moisture comprises a first electrode which is in contact with a gas containing moisture on a first surface thereof and, when a positive voltage is applied thereto, which produces protons from said moisture, a proton conductive solid having first and second portions which is connected to a second surface of the first electrode at the first portion and allows the protons to pass therethrough, and a second electrode which is connected to the second portion of the proton conductive solid on a first surface thereof and in contact with air on a second surface thereof. In a preferred embodiment, the first electrode, the proton conductive solid, and the second electrode are formed as a laminate. When a negative voltage is applied between the first and second electrodes, hydrogen or water is produced from the protons passed through the proton conductive solid.

30 Claims, 11 Drawing Sheets

DEHUMIDIFIER AND METHOD OF USING

This application is a continuation of application Ser. No. 296,057, filed Jan. 6, 1989, now abandoned.

TECHNICAL FIELD

The present invention relates to a dehumidifier which removes moisture from a moisture containing gas.

BACKGROUND ART

Moisture adsorbents such as silica gel and molecular sieves are generally used for removing moisture from gases. Silica gel is a gel of silicic acid having strong adsorptivity and composed of $SiO_2 \cdot nH_2O$. Silica gel is porous and in some cases has a surface area as large as 450 m² per gram. The adsorptivity of silica gel depends upon the amount of water contained therein, and the more dehydrated it becomes, the greater its adsorptivity, so long as the gel structure is maintained. FIG. 7 is a graph showing the amounts of the water adsorbed by adsorbents in which the axis of ordinate represents adsorption and the axis of abscissa represents relative humidity. The adsorptivity of silica gel acts within a wider range than that with activated carbon and is superior to activated carbon with respect to such characteristics as incombustibilty and mechanical fastness.

Conventional moisture adsorbents have problems in that the corrosion of various types of adsorbents easily progresses in environments of high temperature and high humidity, and adsorbents such as silica gel have limited moisture adsorptivity and thus cannot remove moisture from a gas once they have reached the saturated adsorption state. In addition, fixed magnetic disk units which are conventionally installed in air-conditioned rooms exclusively used for such purposes have recently begun to be installed in more general environments, resulting in the need to remove with high reliability the moisture contained in these units.

DISCLOSURE OF THE INVENTION

A dehumidifier to which the present invention relates comprises a first electrode having first and second surfaces, the first surface thereof being in contact with a gas containing moisture and which produces protons from the moisture when a positive voltage is applied thereto, a proton conductive solid having first and second portions, the first portion connected to the second surface of the first electrode, which allows the protons to pass therethrough, and a second electrode having first and second surfaces, the first surface thereof being is connected to the second portion of the proton conductive solid and the second surface in contact with the air, the second electrode generating hydrogen or water from the protons passed through the proton conductive solid when a negative voltage is applied thereto.

In the dehumidifier of the present invention, when a given voltage is applied between the first positive electrode and the second negative electrode, electrolysis takes place at the first electrode to decompose water into oxygen and protons (hydrogen ions). The protons produced by the electrolysis pass through the proton conductive solid and reach to the second electrode where the hydrogen ions are changed to water or hydrogen molecules, whereby the moisture contained in the first electrode is removed.

BEST MODE FOR CARRYING OUT THE INVENTION

Figure 1:
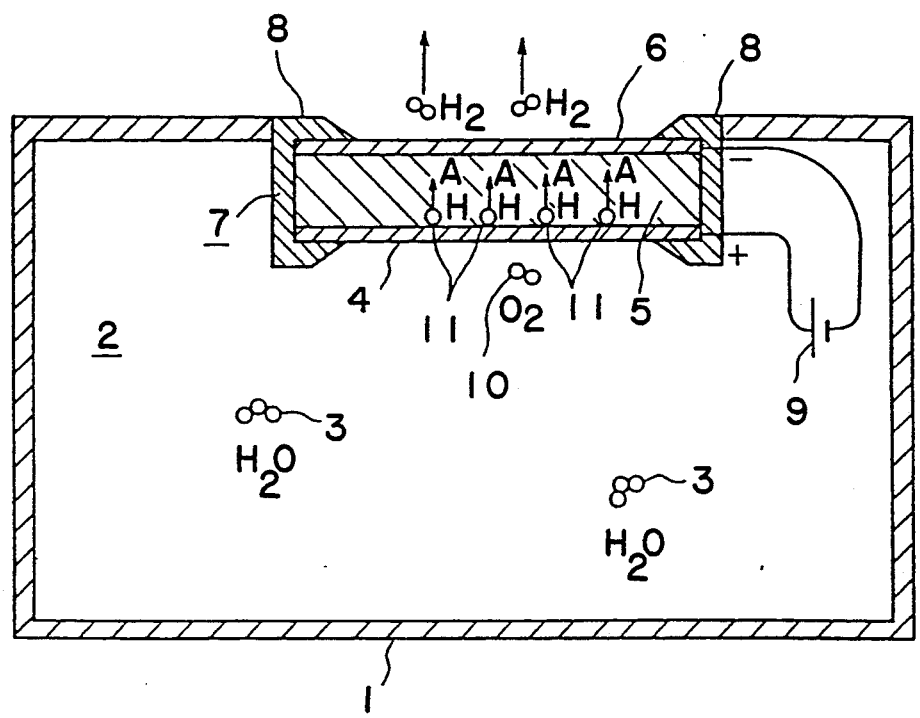
FIG. 1 is an explanatory view of an embodiment of the dehumidifier of the present invention.

Embodiments of the present invention are described below with reference to the drawings. FIG. 1 is an explanatory view of an embodiment of the humidifier of the present invention. In the drawing, reference numeral (1) denotes a vessel; reference numeral (2), a gas which is present in the vessel (1) and which contains moisture; reference numeral (3), water molecules which represent the moisture contained in the gas; reference numeral (4), a porous electrode in contact with the gas (2); and reference numeral (5), a proton conductive solid which is connected to the porous electrode (4) and made of H₃MO₁₂PO₄₀29H₂O or H₃W₁₂PO₄₀29H₂O having high conductivity. Reference numeral (6) denotes a porous electrode which is connected to the proton conductive solid (5) and is in contact with the space outside the vessel (1), the porous electrode (4), the proton conductive solid (5) and the porous electrode (6) being integrally formed as a laminate by a method of contact bonding or vapor deposition to constitute an electrochemical cell (7). Reference numeral (8) denotes an insulator which insulates the cell (7) from the vessel (1) and which is fixed to the vessel (1). Reference numeral (9) denotes a direct current power source which applies a voltage between the positive porous electrode (4) and the negative porous electrode (6). As shown in FIG. 1, porous electrode (4) and porous electrode (6) are directly exposed to the gas within the vessel (1) and the gas on the outside of the vessel (1), respectively, so the electrodes (4) and (6) can be readily contacted by water vapor in the gases.

A description will now be made of the operation. The moisture (3) contained in the gas (2) in the vessel (1) is subjected to the reaction shown below at the boundary between the proton conductive solid (5) and the porous electrode (4) which is positively charged by the voltage applied from the direct current power source (9).

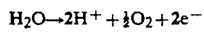

H₂O→2H⁺+½O₂+2e⁻

The moisture (3) contained in the gas (2) is decomposed in accordance with this reaction to allow oxygen molecules (10) to remain in the vessel (1). The hydrogen ions (11) (referred to as protons hereinafter) produced by the decomposition of the moisture move through the proton conductive solid (5) in the direction shown by the arrow A toward the porous electrode (6) which is negatively charged. The protons (11) that reach the porous electrode (6) are subjected to the reaction described below at the boundary between the porous electrode (6) and the proton conductive solid (5).

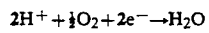

2H⁺+½O₂+2e⁻→H₂O or

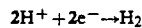

2H⁺+2e⁻→H₂

This reaction produces from the protons water or hydrogen molecules which are released to the space adjacent to the porous electrode (6). As a result, the moisture contained in the gas (2) in he vessel (1) is removed.

In this embodiment, the porous electrode 4, the proton conductive solid (5), and the porous electrode (6) are integrally formed as a laminate in that order, but these members can be provided in any configuration to remove the moisture (3) contained in the gas (2) in the vessel (1) so long as the proton conductive solid (5) is brought into contact with the porous electrodes (4), (6) and a given voltage is applied thereto. In addition, a proton conductive solid composed of substances other than such compositions as the H₃MO₁₂PO₄₀.29H₂O or H₃W₁₂PO₄₀.29H₂O described in the embodiment can display similar effects to that produced in the embodiment.

Figure 2:
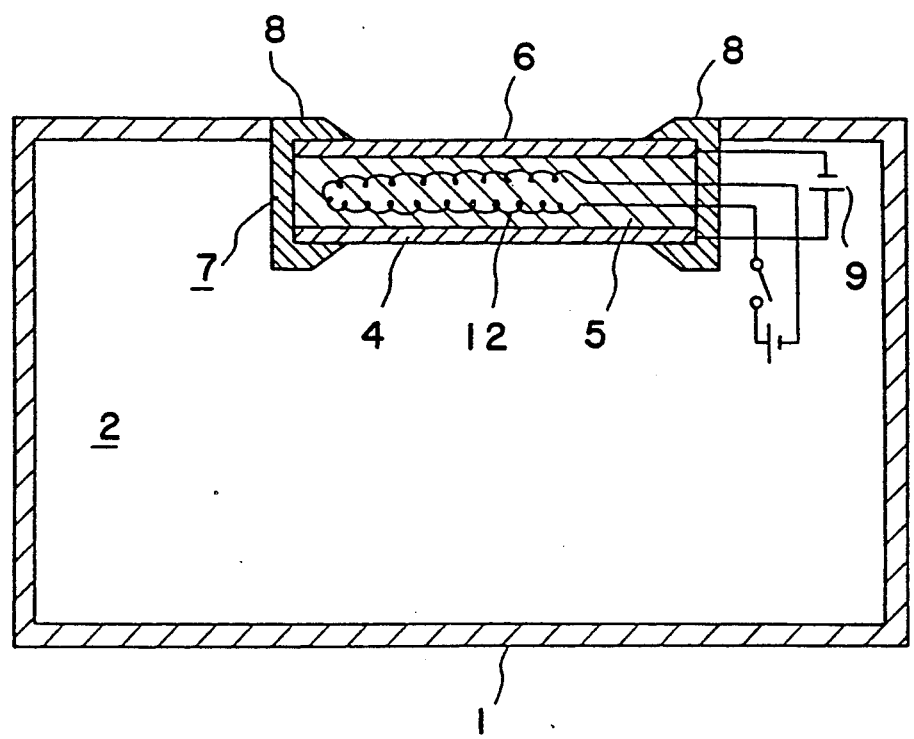
FIG. 2 is an explanatory view of another embodiment of the present invention.

In addition, as shown in FIG. 2, the heater (12) contained in the cell (7) can increase degree of the conductivity and produce a more remarkable effect.

Figure 3A:
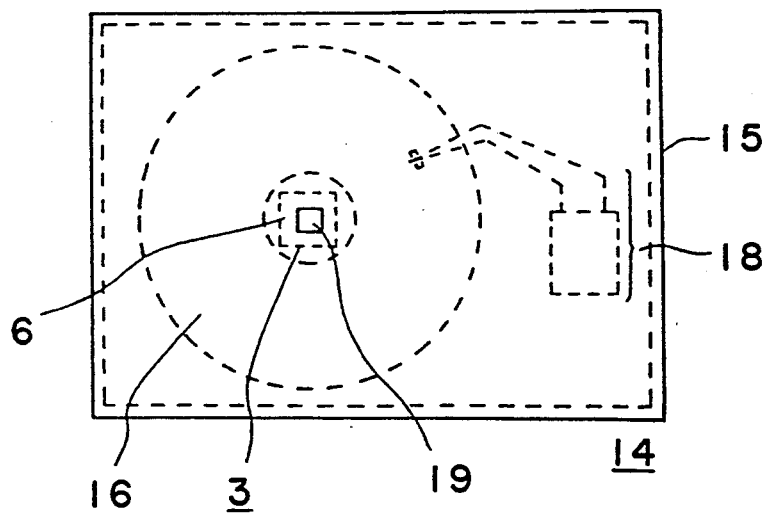
FIG. 3(a) is a plan view of an arrangement in which the dehumidifier of the present invention is installed in a magnetic disk unit.
Figure 3B:
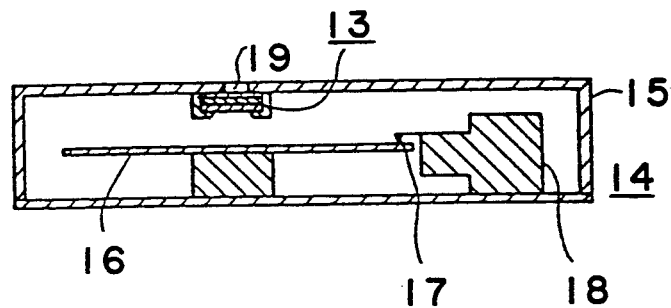
FIG. 3(b) is a sectional side view of the same.

FIGS. 3(a) and 3(b) show a case in which a dehumidifier (13) to which the present invention relates is installed in a magnetic disk unit (14), FIG. 3(a) being a plan view and FIG. 3(b) being a sectional side view. In the drawings, reference numeral (15) denotes a casing of the magnetic disk unti (14); reference numeral (16), a magnetic disk which is received in the casing (15) and in which information is recorded; reference numeral (17), a magnetic head which inputs and outputs the information in the magnetic disk (16); reference numeral (18), a rotary portion which holds the magnetic head (17) and positions it at a given position in the magnetic disk (16); and reference numeral (19), a breathing portion which is opened at a given position in the casing (15) of the magnetic disk (16). The dehumidifier (13) is installed so that the breathing portion (19) is closed by the porous electrode (6) from the inside of the casing (15) and the porous electrode (6) is brought into contact with the air outside the casing (15). When a given voltage is applied between the positive porous electorode (6) and the negative porous electrode (4) of the dehumidifier (13), the moisture contained in the casing (15) of the magnetic disk (14) is removed.

Figure 4A:
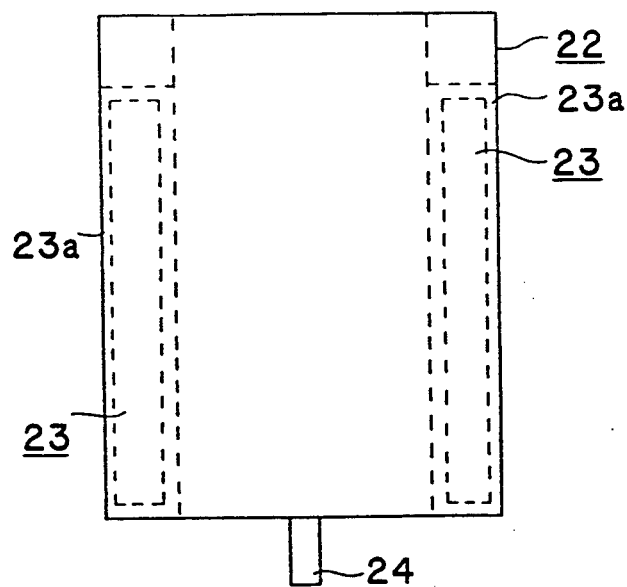
FIG. 4(a) is a plan view of an arrangement in which the dehumidifier of the present invention is installed in a magnetic head.
Figure 4B:
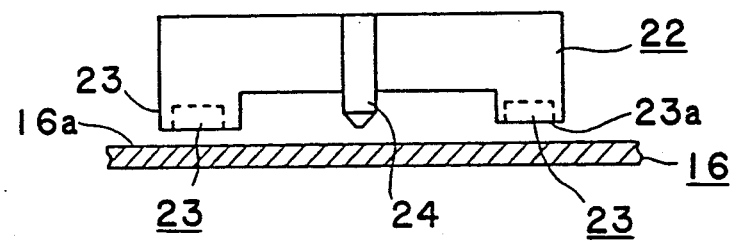
FIGS. 4(b) and 4(c) are a front view and an enlarged view of a slider portion of the same, respectively.
Figure 4C:
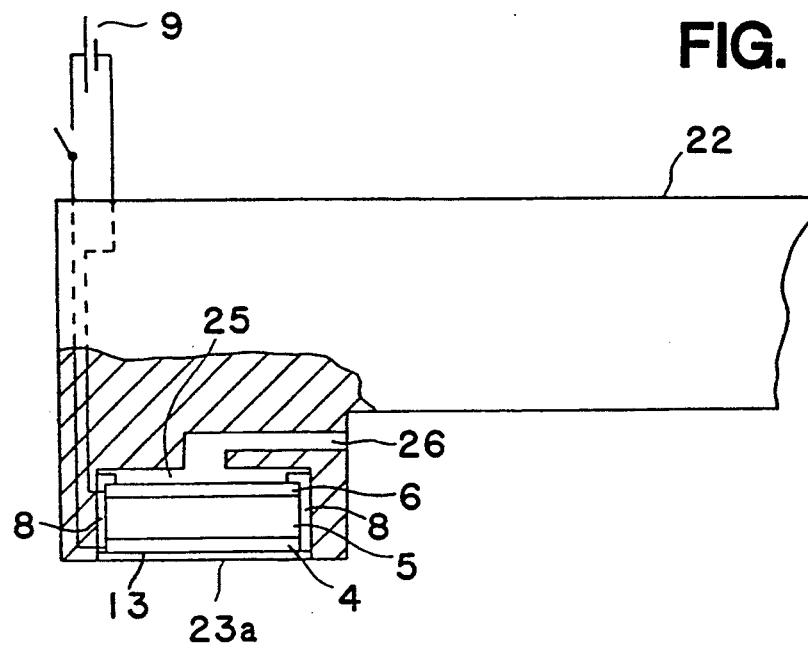

FIGS. 4(a), 4(b), and 4(c) show the dehumidifier (13) FIGS. 3(a) and 3(b) show installed in a slider portion (23) constituting a magnetic head (22) of the magnetic disk unit (14) of FIGS. 3(a) and 3(b), FIG. 4(a) being a plan view, FIG. 4(b) being a front view, and FIG. 4(c) being an enlarged view of the slider portion. Reference numeral (16a) denotes a recording surface of the magnetic disk (16); reference numeral (24), a record/regeneration portion; reference numeral (23), the slider portion; and reference numeral (23a), floating surfaces. The dehumidifier (13) is buried in the slider portion (23) so that the surface of the porous electrode (4) is brought substantially into contact with the floating surface (23a). The dehumidifier (13) provided in the magnetic head configured as described above removes the moisture present between the floating surface (23a) and the recording surface (16a) of the magnetic disk (16) and discharges the moisture to the outside from an air hole (26) through a space (25). It is thus possible to prevent the adsorption phenomenon between the magnetic disk (16) and the floating surface (23a) which would be caused by moisture.

Figure 5:
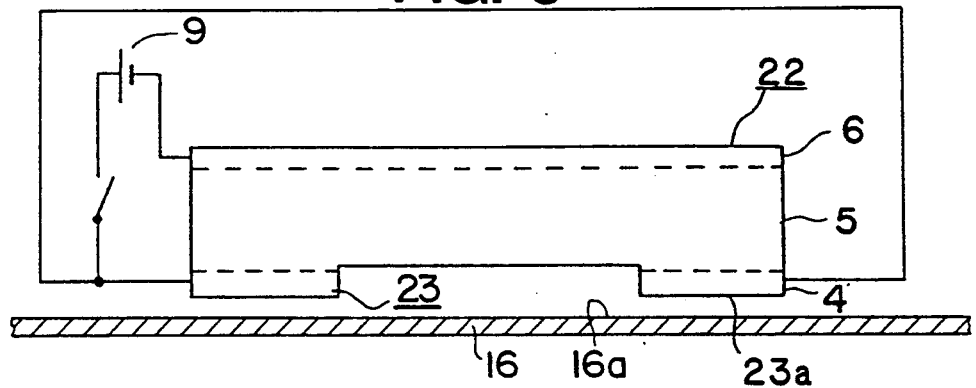
FIG. 5 is a drawing of another arrangement in which the dehumidifier of the present invention is installed in a magnetic head.

A description will now be made of another embodiment of the present invention with reference to FIG. 5. In this embodiment, the whole of the magnetic head (22) is formed as a dehumidifier in which the entire floating surfaces (23a) serve as the porous electrode (4), the entire surface of the magnetic head (22) opposite to the floating surfaces (23a) serves as the porous electrode (6), and the whole of the magnetic head between the two porous electrodes (4), (6) serves as the proton conductive solid (5). When a voltage is applied between the positive porous electrode (4) and the negative porous electrode (6) of the magnetic head (22) configured as described above, the dehumidifier (13) is actuated so that the moisture present between the recording suface (16a) of the magnetic disk (16) and the floating surfaces (23a) can be removed.

Figure 6:
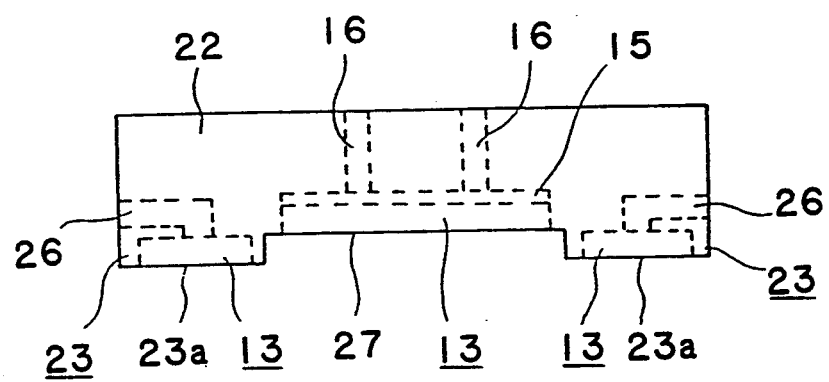
FIG. 6 is a drawing of a further arrangement in which the dehumidifier of the present invention is installed in a magnetic head.
Figure 7:
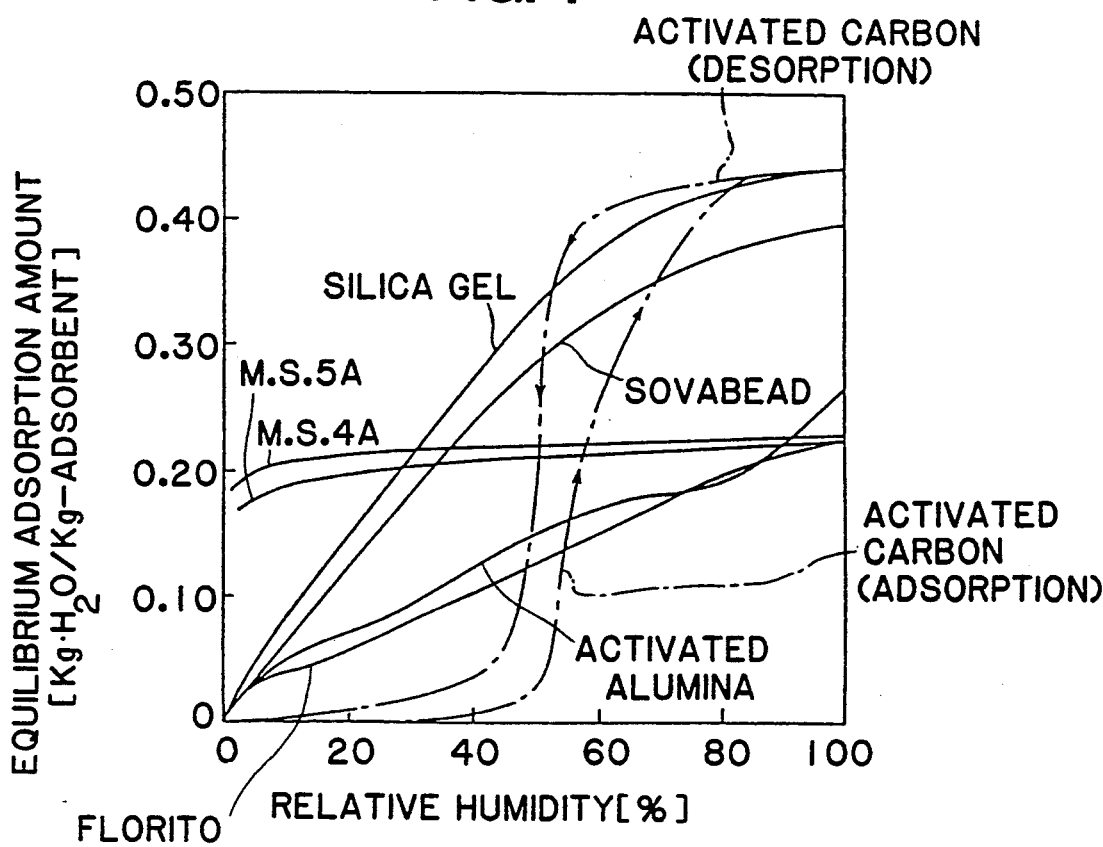
FIG. 7 is a graph showing the adsorption of moisture by adsorbents.

A description will now be made of a further embodiment of the present invention with reference to FIG. 6. In this embodiment, the dehumidifiers (13) are provided in the slider portions (23), as well as being provided in a concave portion (27) of the magnetic head (22) so that the moisture between the recording surface (16a) of the magnetic disk and the floating surfaces (23a) is removed from a portion in the vicinity of the floating surfaces to the outside of the magnetic disk. Such a configuration allows the ability to remove the moisture between the floating sufaces (23a) and the recording surface (16a) to increase. If electrodes made of proton electron-mixed conductive solids can be used in place of the porous electrodes (4), (6), the moisture can be removed with the same configuration as that described above. In this case, each of the proton electron-mixed conductive solids used is a metal or metallic compound such as Pd, LaNi$_5$ or Ti$_3$Ni which can form a metal hydride or a metal oxide such as WO$_3$, ReO$_3$, MoO$_3$, MnO$_2$ or Ni-OOH.H$_2$O. The operation of the dehumidifier using such proton electron-mixed conductive solids as electrodes is described below. The above-described electrolytic reaction which is the same as that in the case of using the porous electrodes first takes place on the contact surface between an electrode (referred to as first electrode hereinafter) which is positively charged and composed of a proton electron-mixed conductive solid and a gas containing moisture. This electrolytic reaction produces protons which pass through the first electrode, then the proton conductive solid and an electrode (referred to as second electrode) which is negatively charged and composed of a proton electron-mixed conductive solid, and finally reaches the contact surface between the second electrode and a space. The protons combine with the electrons in the second electrode to form hydrogen molecules or react with the oxygen in the space to form water, the hydrogen molecules or oxygen then being released to the space.

As described above, the dehumidifier of the present invention comprises the first electrode which is in contact with a gas containing moisture on one surface and, when positively charged, produces protons from the moisture, the proton conductive solid through which the protons are passed, and the second electrode which is in contact with the proton conductive solid on one surface and in contact with a space on the other surface and, when negatively charged, produces hydrogen or water from the protons passed through the proton conductive solid. Therefore, the present invention is capable of continuously removing moisture with high reliability and can provide a dehumidifier having a long lifetime. In addition, the direct current power source in each of the embodiments can be replaced by an optical generating element. In this embodiment of the present invention, the decomposition of water takes place in one of the electrodes, and a reaction takes place in the other electrode to produce water so that humidity is controlled, as well as allowing the electrical energy obtained by the optical generating element to be used as the power source. Therefore, this embodiment has the semipermanent function of controlling humidity.

Figure 8:
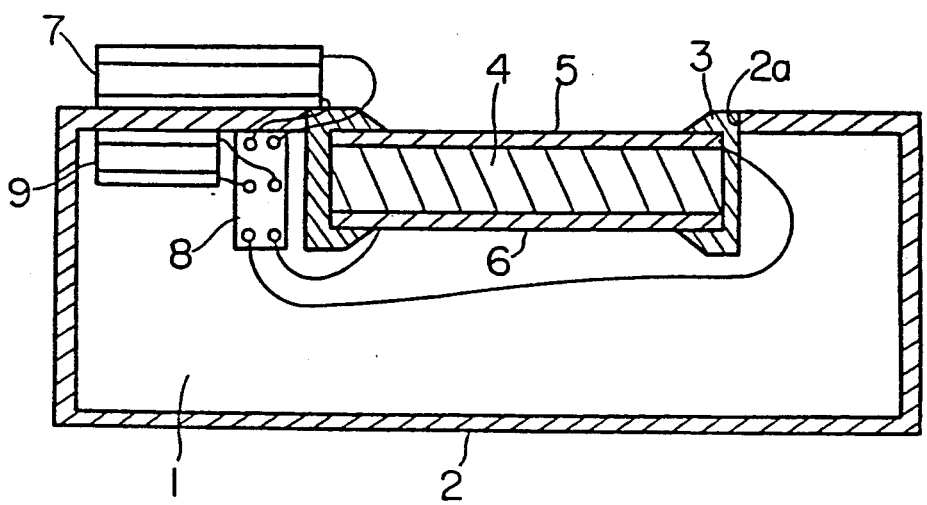
FIG. 8 is a sectional side view of an embodiment of the present invention.

FIG. 8 shows a still further embodiment of the present invention in which an opening (2a) is provided in the upper surface of a vessel (2) of a magnetic disk unit which forms a space (1) in which humidity is to be controlled (referred to simply as "space" hereinafter). An electrode (5) on the air side and an electrode (6) on the vessel side with a partition between them consisting of a diaphragm (4) composed of a proton conductive solid are supported by the opening (2a) through a frame (3) composed of an insulator. A photoelectric element (7) provided on the upper surface of the vessel (2) is connected to the electrodes (5), (6) and a secondary battery (9) through a controller (8).

Although the controller (8) and the secondary battery (9) are provided in the vessel (2) shown in the drawing, these units may alternatively be disposed outside of the vessel (2).

The function is as follows: Light energy is transformed into electrical energy in the photoelectric element (7), and the electrical energy is stored in the secondary battery (9) as occasion demands. The voltage input to the controller (8) is adjusted to a value within the given range of 0 to 2.5 V by the controller (8) and is applied between the electrode (5) on the air side and the electrode (6) of the vessel side.

When the space (1) in which humidity is to be controlled is dehumidified, a current is controlled by the controller so as to pass through the diaphragm from the electrode (6) on the vessel side to the electrode (5) on the air side. Consequently, the moisture contained in the space (1) is decomposed by the electrode (6) on the vessel side in accordance with the following reaction:

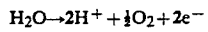

The moisture is decomposed in accordance with this reaction, and oxygen remains in the space (1). The hydrogen ions (referred to as protons hereinafter) produced by the decomposition of water move through the diaphragm (4) toward the electrode (5) on the air side. The protons that reach the electrode (5) on the air side are subjected to the reaction described below at the boundry between the electrode (5) on the air side and the diaphragm (4).

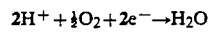

or

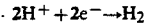

The water or hydrogen molecules produced from the protons in accordance with the above-described reaction are released to the air. In this way, the space 1 is dehumidified.

When the space 1 is to be humidified, the direction of passage of that current is reversed. As a result, the reaction taking place in the electrode (5) on the air side takes place in the electrode (6) on the vessel side, and the reaction taking place in the electrode (6) on the vessel side takes place in the electrode (5) on the air side, the reactions progressing in the reverse direction and the space 1 being humidified.

The speeds of dehumidification and humidification in the above-described operations are proportional to the current passing between the electrode (5) on the air side and the electrode (6) on the vessel side. Therefore, increases in the speeds of dehumidification and humidification can be achieved by connecting a plurality of optical generating elements (7) in series to increase the terminal voltage between the two electrodes (5), (6). A plurality of optical generating elements (7) may be connected in series, in parallel, or in combinations thereof, and the current is controlled by the controller (8) so that any current unnecessary for controlling humidity is passed to the secondary battery (9) and stored therein to be discharged for controlled humidity as occasion demands.

The present invention can be suitably applied to the control of humidity in a vessel of a magnetic disk unit, as well the control of humidity in any vessels of the type that are closed.

An example of a diaphragm (4) is one composed of a proton conductive solid comprising a polymeric solid electrolyte.

As described above, in this embodiment, moisture is removed and added by using an electrochemical cell, and the optical generating element which can utilize light rays (sun rays) existing outside is used as a source of energy. Thus, this embodiment has the effect that the humidity of a gas can be continuously controlled with high reliability, without the need for the maintenance cost.

A futher embodiment, described below, is arranged such that the terminal voltage between the two electrodes is controlled.

A moisture controller related to this embodiment comprises a humidity control element which is formed as a unit by laminating a first electrode to be in contact with a gas containing moisture on its one surface, a hydrogen ion conductive solid, and a second electrode to be in contact with the air on the other surface, a power source which changes the moisture into ions and causes the ions to move between the two electrodes of the humidity control element, a voltage detection means which detects the terminal voltage between the two electrodes of the humidity control element, and a voltage controller which controls the terminal voltage of the humidity control element to prevent it from rising above a given value, corresponding to signals from the voltage detection means.

In this embodiment, when the humidity control element is charged with a direct current, water is decomposed in the electrode through which the current is being passed and water is produced in the electrode from which the current is passing so that the humidity of the gas containing moisture is controlled, and the voltage controller controls the terminal voltage between the two electrodes of the humidty control element which is detected by the voltage detection means so as to prevent it from rising above a given value so that no side reactions other than the above-described reactions are caused.

Figure 9:
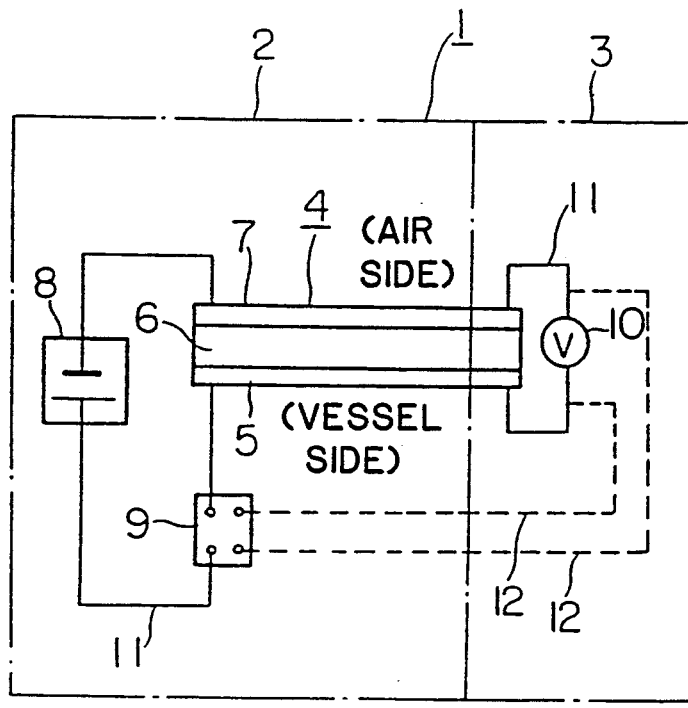
FIG. 9 is an explanatory view of the embodiment of the present invention.

FIG. 9 is an explanatory view of this embodiment of the present invention. In the drawing, a humidity controller (1) comprises a humidity control part (2) and voltage detection part (3) and is received in a vessel (not shown) in an atmosphere consisting of a gas containing moisture. A humidity control element (4) is disposed in the humidity control part (2), the humidity control element (4) comprising a first electrode (5) which is disposed (on the vessel side) in contact with the gas containing the moisture in the vessel which receives the humidity controller (1), a hydrogen ion conductive solid (6) such as a thin film of a polymeric solid electrolyte provided adjacent to the first electrode (5), and a second electrode (7) which is provided (on the air side) adjacent to the hydrogen ion conductive solid (6) and in contact with the air. Noble metal electrodes such as platinum electrodes or platinum electrodes with lutetium adhered thereto can be used as the first electrode (5) and the second electrode (7), and these electrodes can be provided on the hydrogen ion conductive solid (6) by a method of electroless plating. An example of what may be used as the thin film of polymeric solid electrolyte of the hydrogen ion conductive solid (6) is Nafion (trade name, produced by Du Pont Co., Ltd.) which is one form of ion-exchange membrane. A power source (8) is connected to the humidity control element (4) through a voltage controller (9), and a direct current voltage is applied to the humidity control element (4) by the power source (8).

A voltage detection element (10) is provided in the voltage detection part (3), the voltage detection element (10) being connected to the first and second electrodes (5), (7) of the humidity control element (4) through lead wires (11). The voltage detection element (10) detects the terminal voltage of the humidity control element (4), feeds the voltage detected back to the voltage controller (9) through lead wires (12), and maintains the terminal voltage applied to the humidity control element (4) at a given value.

The operation of the humidity control part (2) of the humidity controller (1) configured as described above is as follows: Since a direct current voltage is applied to the humidity control element (4) from the power source (8), the moisture contained in the gas in the vessel in contact with the positive first electrode (5) is positively charged and subjected to the reaction described below on the first electrode (5).

$$H_2O \rightarrow 2H^+ + \tfrac{1}{2}O_2 + 2e^- \tag{1}$$

The moisture contained in the gas is decomposed in accordance with this reaction, and oxygen molecules remain in the vessel. The hydrogen ions produced by the decomposition of water are moved through the hydrogen ion conductive solid (6) toward the second electrode (7) and reach to the second electrode (7) having a surface in contact with the air. The hydrogen ions that reach the negative second electrode (7) are subjected to the reaction described below with the oxygen in the air.

$$2H^+ + \tfrac{1}{2}O_2 + 2e^- \rightarrow H_2O \tag{2}$$

The water produced by this reaction is released in the air. Consequently, the moisture contained in the gas in the vessel is released to the air.

Figure 10:
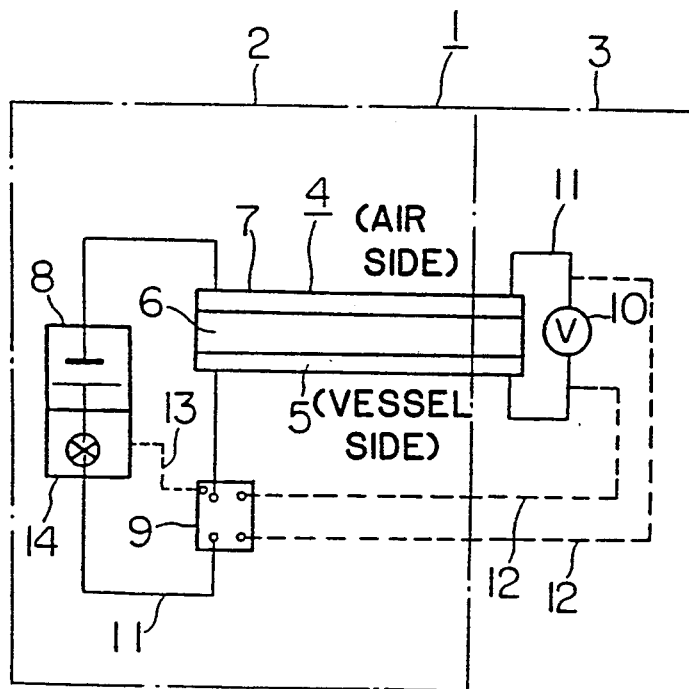
FIG. 10 is an explanatory view of another embodiment of the present invention.

Conversely, when the moisture in the air is moved into the vessel, i.e., the vessel is humidified, as shown in FIG. 10, if the polarities of the power source (8) are reversed by a polarity changing switch (14) through a lead wire (13), the direction of passage of the current is reversed, and thus, the reaction on the first electrode (5) (Formula 1) and the reaction on the second electrode (7) (Formula 2) are interchanged, whereby the gas in the vessel is humidified.

Figure 11:
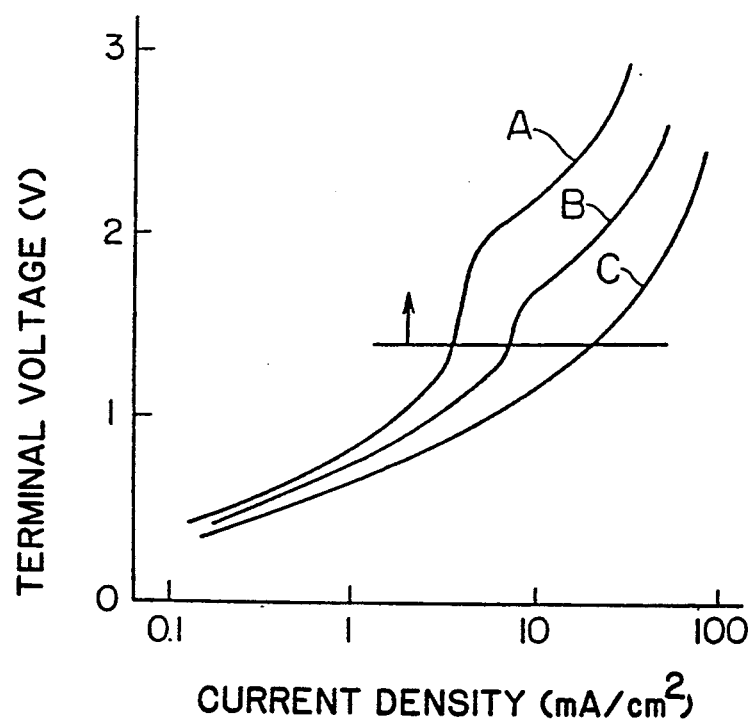
FIG. 11 is a graph showing the relationship between the current density and the terminal voltage of a humidity controller of the present invention.

FIG. 11 shows the results obtained from the measurements of the relationship between the current density and the terminal voltage by using the voltage detection element (10). In the drawing, curves A, B and C represents the cases of humidities of 20%, 35% and 85%, respectively, and hydrogen is produced within the range above the line shown by the arrow. When humidity is low, the terminal voltage is generally higher than those in the cases with higher humidity, and the terminal voltage rapidly increses at a point near 1.5 V. As a result of various investigations conducted by the inventors with respect to these phenomena, it was found that the terminal voltage within a range of low humidity is higher than that within a range of high humidity because the resistance of the thin film of a polymeric solid electrolyte of the hydrogen ion conductive solid (6) decreases with the increase in the water content, and thus the level of the terminal voltage depends upon the degree of humidity. It was also found that the rising of the terminal voltage at a point near 1.5 V is caused by the production of a hydrogen-generating reaction as a side reaction. In other words, within a range of low current densities, the reactions described below take place.

Anodic reaction
(Dehumidifying reaction)

$$H_2O \rightarrow 2H^+ + \tfrac{1}{2}O_2 + 2e^-$$

$E°_A = 1.23$ V (relative to SHE)

Cathodic reaction
(Humidifying reaction)

$$H_2O \leftarrow 2H^+ + \tfrac{1}{2}O_2 + 2e^-$$

$E°_C = 1.23$ V (relative to SHE)

Total reaction $$\underset{\text{(on the dehumidification side)}}{H_2O} \longrightarrow \underset{\text{(on the dehumidification side)}}{H_2O}$$

Theoretical decomposition voltage $$Ed = E°_A - E°_C = 0V$$

Namely, the theoretical decomposition voltage is not involved in the main components of the terminal voltage which involves only an ohmic loss of the polymeric solid electrolyte and an overvoltage between the anode and cathode.

However, if the terminal voltage is increased within a range of low humidity or high currents, the reactions described below take place.

Anodic reaction
(Dehumidifying reaction)

$$H_2O \rightarrow 2H^+ + \tfrac{1}{2}O_2 + 2e^-$$

$E°_A = 1.23$ V (relative to SHE)

Cathodic reaction
(Humidifying reaction)

$$H_2 \leftarrow 2H^+ + 2e^-$$

$E°_C = 0$ V (relative to SHE)

Total reaction $$\underset{\text{(on the dehumidification side)}}{H_2O} \longrightarrow \underset{\text{(on the air side)}}{H_2} + \underset{\text{(on the vessel side)}}{\tfrac{1}{2}O_2}$$

Theoretical decomposition voltage $$Ed = E°_A - E°_C = 1.23\ V$$

A hydrogen-generating reaction takes place as a side reaction, and this reaction causes the rising of the terminal voltage.

This reaction can be neglected in a case in which the humidity controller (1) performs only dehumidification, but it becomes a problem in a case in which the humidity controller performs dehumidification and humidification.

In the humidity controller (1) of the present invention, therefore, the terminal voltage of the humidity control element is detected by the voltage detection element (10) and fed back to the voltage controller (9) which controls the voltage so as to prevent it from rising above a given value previously set, whereby the occurrence of the side reaction is prevented.

Figure 12:
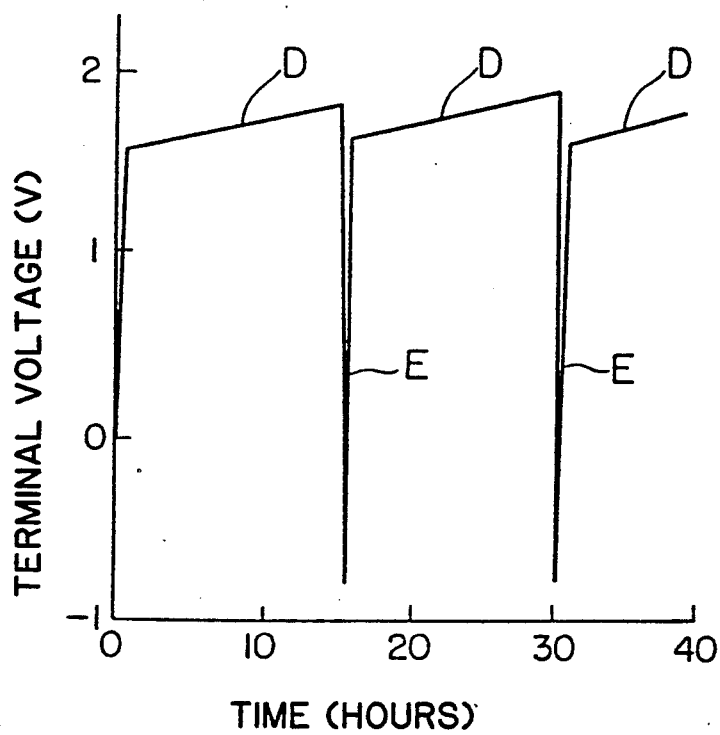
FIG. 12 is a graph showing the change with time of the terminal voltage of the humidity controller of the present invention.

FIG. 12 shows the change with time of the terminal voltage of the humidity controller (1) at a given value of direct current (5 mA). As shown by D in the drawing, the terminal voltage of the humidity controller (1) increases with the passage of time. This is because, if the current is passed for a long time, the concentration of the hydrogen ions in the hydrogen ion conductive solid (6) becomes high in the vicinity of the cathode (the electrode on the humidification side) and becomes low in the vicinity of the anode (the electrode on the dehumidification side). The polarity changing switch (14) is provided for removing such a non-uniform distribution in the concentrations of hydrogen ions. A direct current is passed through the humidity controller (4) in the reverse direction for a short time, and the direction of passage of the current is returned to the initial direction so that the non-uniform distribution of the concentration of hydrogen ions is removed, resulting in the function of inhibiting the terminal voltage from increasing endlessly (shown by E in FIG. 12).

Figure 13:
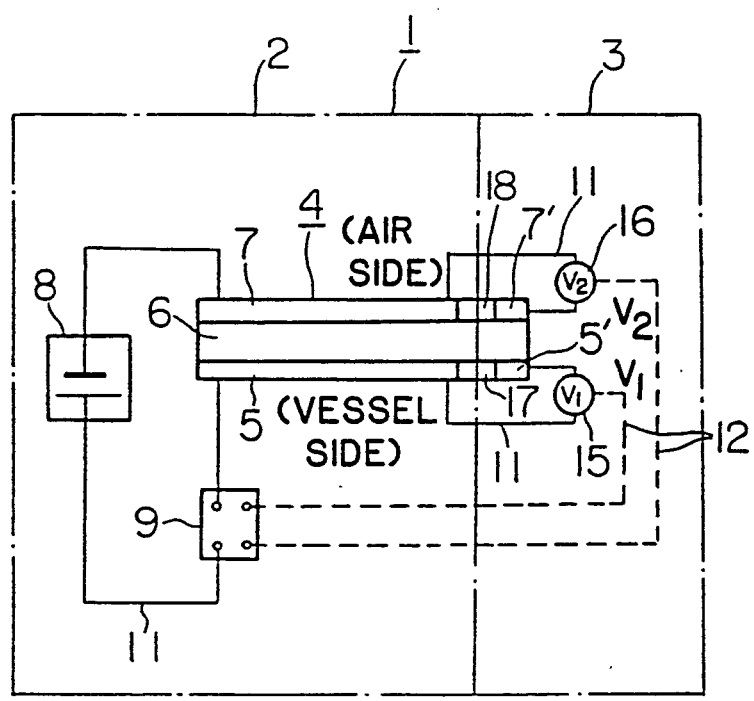
FIG. 13 is an explanatory view of a further embodiment of the present invention.

FIG. 13 is an explanatory view of a case in which a voltage detection element is separately provided in each of the first electrode (5) and the second electrode (7) so as to separately control the voltages of these electrodes. When it is desired to strictly control the total reaction which is the sum of the anodic reaction and the cathodic reaction, the voltage of each of the first electrode (5) and the second electrode (7) can be controlled by combination of voltage detection elements (15), (16) and the voltage controller (9). In other words, the first electrode (5) and the second electrode (7) are divided to produce divided first and second electrodes (5') and (7') by insulators (17) and (18), respectively. The voltage detection element (15) is connected between the divided first electrodes (5') and (5), and the voltage detection element (16) is connected between the divided second electrodes (7') and (7). The voltages from the voltage detection elements (15), (16) are fed back to the voltage controller (9) through lead wires (12) so that the voltage of each of the electrodes is kept at a given value.

Figure 14:
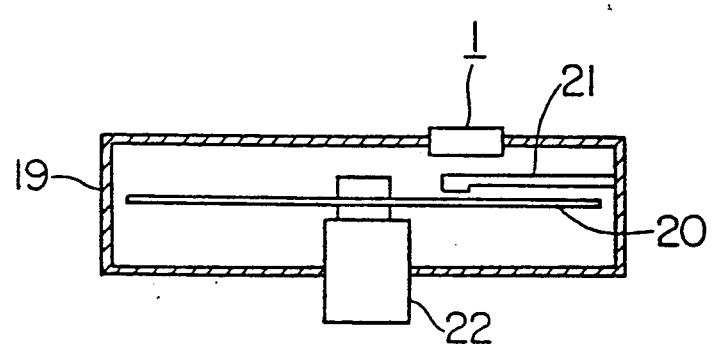
FIG. 14 is a schematic diagram in which the humidity controller of the present invention is applied to a magnetic disk unit.

FIG. 14 is a schematic diagram of a case in which the humidity controller (1) is applied to a magnetic disk unit. In the drawing, a magnetic disk unit (vessel) (19) contains a magnetic disk (20), a head (21) for writing information in the magnetic disk (20) and reading information therefrom, and a drive (22) for driving the magnetic disk (20). The humidity controller (1) is partially exposed in the magnetic disk unit (19), the other portion being partially exposed to the outside of the magnetic disk unit (19).

Figure 15:
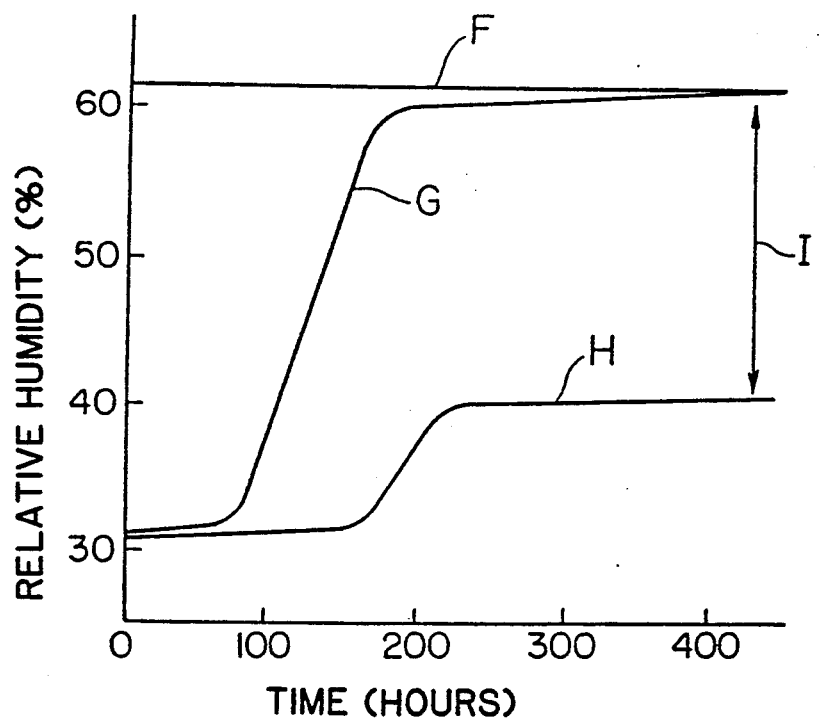
FIG. 15 is a graph showing the state of dehumidification of the humidity controller provided in the magnetic disk unit shown in FIG. 14.

FIG. 15 is a graph showing the state of dehumidification at 25° C. in the humidity controller (1) which is applied to the magnetic disk unit (19) shown in FIG. 14. In the drawing, the relative humidity of the atmosphere is 62% (shown by F in the drawing), and the initial relative humidity in the magnetic disk unit (19) is about 32%. A blank vessel (shown by G in the drawing) is the magnetic disk unit (19) in which the humidity controller (1) is not provided, and a vessel with the humidity controller (shown by H in the drawing) is the magnetic disk unit (19) in which the humidity controller (1) is provided. As seen from FIG. 15, a difference in the humidities is apparent after 400 hours have passed (shown by I in the drawing), this indicating that the humidity controller (1) has the effect of controlling humidity.

Each of the above-described embodiments concerns the case in which the humidity controller (1) is applied to the magnetic disk unit (19), but the humidity controller (1) can be widely applied in other closed-type vessels. The above-described embodiments also concern the cases in which the voltage detection elements (10), (15), (16) are employed for controlling the reactions produced on the electrodes, but, when a dry battery having a certain life is used as the power source (8), these voltage detection elements can be used for detecting the life of the dry battery used. As described above, this embodiment comprises a humidity control element which is formed as a unit by laminating a first electrode in contact with a gas containing moisture on one surface thereof, a hydrogen ion conductive solid, and a second electrode in contact with the air on the other surface; a power source which changes the moisture to ions and moves the ions between the two electrodes of the humidity control element; a voltage detection means for detecting the terminal voltage between the two electrodes of the humidity control element; and a voltage controller for controlling the terminal voltage of the humidity control element so as to prevent it from rising above a given value, corresponding to the signals from the voltage detection means. Therefore, the embodiment has the effect that the humidity of a gas in a vessel can be continuously controlled to any given value, without the occurrence of contact with the air and danger of inclusion of impurity gases in the air.

A still another embodiment aims to provide a humidity controller which can continuously control the moisture, i.e., humidity, in a gas phase with high reliability and can indicate the state of control of humidity in a vessel. A humidity controller related to this embodiment comprises a hydrogen ion conductive solid electrolyte, an electrochemical element which has a first and second electrode disposed opposite to each other through the hydrogen ion conductive solid electrolyte, one of the first and second electrode being provided in contact with a space in which the humidity is to be controlled and the other electrode being in contact with the air so that the humidity of the space is controlled by applying a voltage between the first and second electrode; and a display which indicates the humidity in the space in correspondence with the quantity of electricity passing through the electrochemical element.

In this humidity controller of the present invention, when a given voltage is applied between the positive electrode of the electrochemical element in contact with the space and the negative electrode thereof in contact with the air, the moisture contained in the space is decomposed by electrolysis at one of the electrodes to produce oxygen and protons (hydrogen ions). The protons produced by the decomposition are passed through the hydrogen ion conductive solid electrolyte and reach the other electrode in contact with the air, and the hydrogen ions that reach react with the oxygen in the air at the other electrode to produce water or hydrogen molecules, whereby the moisture in the space is removed. At the same time, the air side in contact with the latter electrode is humidified. If the direction of passage of the current is reversed, the space in contact with the former electrode is humidified so that the humidity in the space is controlled. An electrical signal or optical signal is generated corresponding to the current passing through the electrochemical element, with the state of control of the humidity thereby being displayed to the outside.

Figure 16:
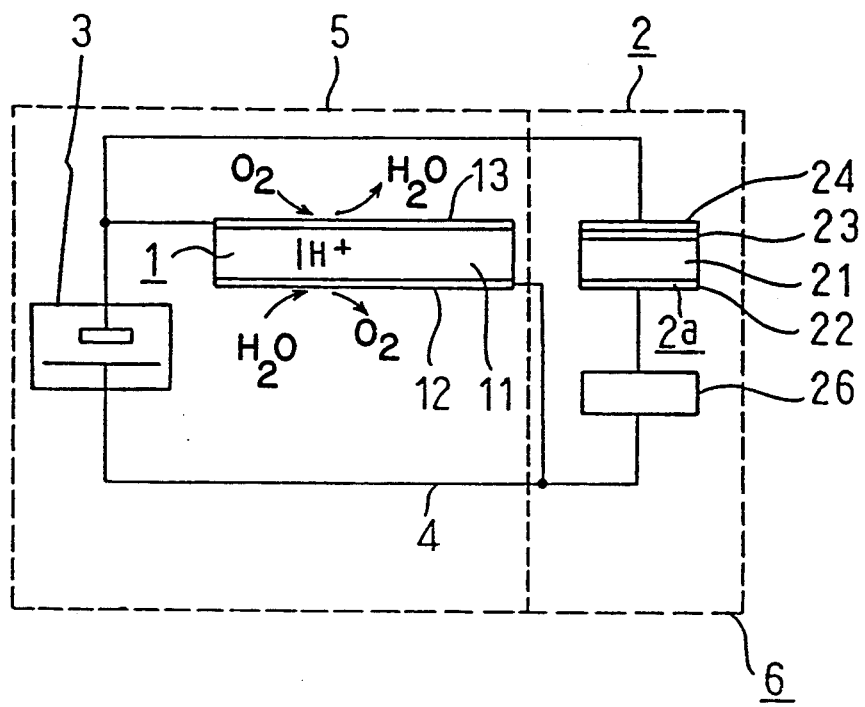
FIG. 16 is a block diagram of a principal portion of an embodiment of the humidity controller of the present invention.

In FIG. 16, reference numeral (1) denotes an electrochemical element which controls the humidity in a space to be controlled (not shown) and which comprises a hydrogen ion conductive solid electrolyte (11) and a first electrode (12) and a second electrode (13) which are disposed opposite to each other through the hydrogen ion conductive solid electrolyte (11). This embodiment employs a fluorine resin (polymeric solid electrolyte) in which —SO₃H groups are introduced as the hydrogen ion conductive solid electrolyte (11). "NAFION" (trade name, produced by Du Pont Co., Ltd.) available at the market can be used as the fluorine resin. A porous metal is used as either of the first electrode (12) or the second electrode (13). The first electrode (12) is provided in contact with the space (not shown), and the second electrode (13) is provided in contact with the air. Reference numeral (2) denotes a display which has a display portion (2a) comprising a $\beta$-alumina substitution product (21) as a solid electrolyte, a counter electrode (22) in which one of the surfaces is in contact with the $\beta$-alumina substitution product (21) and the other surface is in contact with the space to be controlled, a display electrode in the form of a coloring electrode (23) which is provided opposite to the counter electrode (22) through the $\beta$-alumina substitution product (21) and is made of a WO₃ thin film, and a clear conductive film (24) which covers the coloring electrode (23); and a controller (26) which supplies between the counter electrode (22) and the clear conductive film (24) of the display portion (2a) a current corresponding to the current passing through the electrochemical element (1). Reference numeral (3) denotes a direct current source which supplies electrical energy required for the electrochemical element (1) and the display (2). The direct current source (3) has a controller for controlling the output voltage to be usually 1 to 3 V and an inverter which inverts the polarities of the output voltage, but these units are not shown in the drawing for the sake of simplicity. Reference numeral (5) denotes a humidity control portion, and reference numeral (6) denotes a humidity controller.

A description will now be made of the operation of the humidity control portion (5).

The moisture contained in the gas in the space to be controlled (not shown) in contact with a first electrode (12) is subjected to the reaction described below on the first electrode (12) because the first electrode (12) is positively charged by the voltage applied from the source (3).

$$H_2O \rightarrow 2H^+ + \tfrac{1}{2}O_2 + 2e^- \qquad (1)$$

The moisture contained in the gas in the space to be controlled is decomposed in accordance with this reaction, and oxygen molecules remain in the space to be controlled. The hydrogen ions produced by the decomposition of the moisture are moved through the hydrogen ion conductive solid electrolyte (11) toward the second electrode (13) and reach the second electrode (13) having the contact surface with the air. The reaction described below takes place on the second electrode (13).

$$2H^+ + \tfrac{1}{2}O_2 + 2e^- = H_2O \qquad (2)$$

or $$2H^+ + 2e^- \rightarrow H_2 \qquad (3)$$

Water or hydrogen molecules are produced from the hydrogen ions in accordance with this reaction, the water or hydrogen molecules produced being released to the air which is in contact with the second electrode (13). As a result, the moisture contained in the gas in the space to be controlled is removed to the air. When the moisture in the air is moved in reverse into the vessel, when the vessel is humidified, if the polarities of the direct current source (3) are inverted, the reaction on the first electrode (12) and the reaction on the second electrode (13) are interchanged with each other, resulting in the humidification of the gas in the space to be controlled.

A description will now be made of the operation of the display (2).

Part of the current passing through the electrochemical element (1) is set by the controller (26) to a current value corresponding to the speed of dehumidification or humidification.

The operation at dehumidification is as follows: A current passes through a solid electrolyte used for the display portion (2a) which is, in this case, the β-alumina substitution product (21) serving as the hydrogen ion conductive solid electrolyte, from the counter electrode (23) toward the coloring electrode (23) and the clear conductive film (24). The reaction described below takes place on the coloring electrode (23) which is colored to a blue color in proportion to the quantity of electricity.

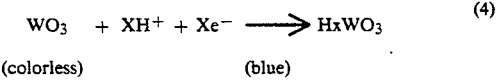

$$WO_3 + XH^+ + Xe^- \longrightarrow H_xWO_3 \qquad (4)$$
(colorless) \qquad\qquad\qquad (blue)

The degree of dehumidification depends upon the degree of the blue color of the coloring electrode (23).

On the other hand, when the gas in the vessel is humidified, a current is passed in the reverse direction, and the reaction described below takes place on the coloring electrode (23).

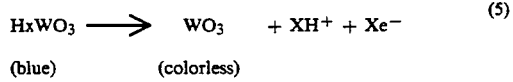

$$H_xWO_3 \longrightarrow WO_3 + XH^+ + Xe^- \qquad (5)$$
(blue) \qquad (colorless)

The coloring electrode (23) is discolored in correspondence with the degree of humidification.

Figure 17:
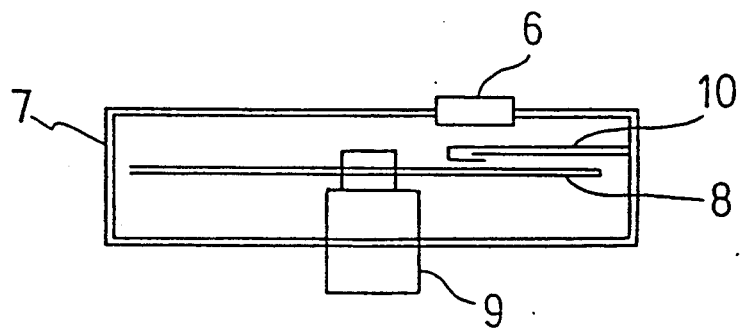
FIG. 17 is a sectional view of a principal portion of a case in which the embodiment shown in FIG. 16 is used for dehumidifying a magnetic disk unit.

FIG. 17 is a sectional view of a principal portion of the case in which a humidity controller (6) as shown in FIG. 16 and described above is used in a fixed disk unit. In the drawing, reference numeral (7) denotes a casing which receives a magnetic disk (8); reference numeral (9), a servomotor which causes the magnetic disk (8) to rotate in the casing (7); and reference numeral (10), a magnetic head for writing information in the magnetic disk (8) or reading it therefrom. In this application, the space within the casing (7) which receives the magnetic disk (8) is a space to be controlled, the surfaces of the first electrode (12) of the electrochemical cell (1) and the counter electrode (22) of the display portion (2a) are disposed so as to be in contact with the space in the casing (7), and the the second electrode (13) and the coloring electrode (23) are disposed to be in contact with the outside of the casing (7), so that the state of control of humidity in the casing (7) can be observed by the degree of coloring (blue) of the coloring electrode (23) from the outside.

Although the above-described embodiment concerns the case using the $WO_3$ thin film as the coloring electrode (23) and the β-alumina substitution product as the solid electrolyte (23), these elements are not limited to such substances. For example, if an $Li^+$ ion conductive solid electrolyte such as Li- β-alumina is used as the solid electrolyte (21), the same effect is obtained.

In addition, although the above-described embodiment concerns the case in which the display (2) has the function of detecting the state of dehumidification or humidification as the change in light, the display (2) is not limited to this. For example, an electrochemical integrator such as a silver ion electron-mixed conductor is used so as to be able to detect as an electrical signal the direction of the current passing through the humidity control portion (5), the voltage valve corresponding to the quantity of the current passing or the current value and to indicate it.

Furthermore, the electrochemical element (1) used in the humidity control portion (5) is just an example, and it can be replaced by any one of various elements, with the same effect being obtained. This is applied to the direct current source (3). Examples that may be used as the hydrogen ion conductive solid electrolyte (11) include $H_3Mo_{12}PO_{40}29H_2O$ and $H_3W_{12}PO_{40}29H_2O$.

Although the above description concerns cases which each employ the humidity controller of the present invention for controlling humidity in a magnetic disk unit, the humidity controller can be widely applied in other closed-type apparatuses which require dehumidification or the control of humidity. As described above, the present invention comprises the electrochemical element which has the hydrogen ion conductive solid electrolyte, and the first and second electrodes that are disposed opposite to each other through the hydrogen ion conductive solid electrolyte; one of the first and second electrodes being disposed in contact with the space to be controlled and the other electrode being disposed in contact with the air, so that the humidity in the space to be controlled is controlled by applying a voltage between the first and second electrodes; and the display which displays the humidity in the space to be controlled corresponding to the quantity of electricity passing through the electrochemical element. Therefore, the present invention has the effects that humidity can be continuously controlled with high reliability and the state of control of the humidity in the space can be easily observed from the outside thereof.

A futher embodiment is described below.

A humidity controller related to this embodiment comprises a humidity control element which is formed as a unit by laminating a first electrode in contact with a gas containing moisture on one surface thereof, a hydrogen ion conductive solid, and a second electrode in contact with the air on the other surface; a power source which changes the moisture to ions and moves the ions between the two electrodes of the humidity control element; and a humidity sensor which controls the humidity in the gas atmosphere containing moisture to a given value. In this embodiment, when a direct current is passed through the humidity control element, the decomposition of water takes place on the electrode in which the current is passed, and the production of water takes place on the electrode from which the current is passed so that the humidity in the gas containing moisture is controlled, as well as the direction and strength of the current to be passed through the humidity control element being controlled in correspondence with the signals from the humidity sensor, whereby the humidity in the gas containing moisture is continously controlled to be any given value.

Figure 18:
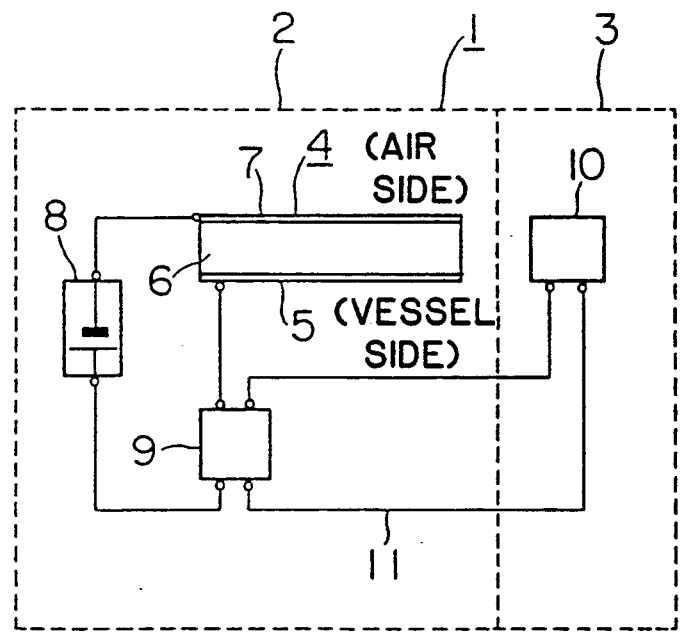
FIG. 18 is an explanatory view of a still further embodiment of the present invention.

FIG. 18 is an explanatory view of this embodiment. In the drawing, the humidity controller (1) comprises a humidity control portion (2) and a humidity detection portion (3) and is received in a vessel (not shown) of a gas atmosphere containing moisture. A humidity control element (4) is provided in the humidity control portion (2) and comprises a first electrode (5) disposed in the vessel receiving the humidity controller (1), a hydrogen ion conductive solid (6) such as a polymeric solid electrolyte, and a second electrode (7) disposed adjacent to the hydrogen ion conductive solid (6) on the side of the air. A noble metal electrode such as a platinum electrode or a platinum electrode to which ruthenium is adhered can be used as each of the first and second electrodes (5) and (7), and these electrodes can be provided on the hydrogen ion conductive solid (6) by a method of electroless plating. A power source (8) is connected to the humidity control element (4) through a voltage controller (9), and a direct current voltage is applied to the humidity control element (4) from the power source (8).

The humidity detection portion (3) receives a humidity sensor (10) which detects the humidity in the vessel and sends the detected electrical signal to the voltage controller (9) through lead wires (11). The voltage controller (9) controls the direction and the strength of the current passed through the humidity control element (4) in correspondence with the signals from the humidity sensor (10).

The humidity control portion (2) of the humidity controller (10) configured as described above operates as described below. Since a direct current is applied to the humidity control element (4) from the power source (8), the moisture contained in the gas in the vessel contacting the positive first electrode (5) is positively charged, and the reaction described below takes place on the first electrode (5).

(1)

The moisture contained in the gas is decomposed in accordance with this reaction, and the produced oxygen molecules remain in the vessel. The hydrogen ions produced by the decomposition are moved through the hydrogen ion conductive solid (6) toward the second electrode (7) and reach the second electrode (7) having the contact surface with the air. The reaction described below takes place on the second electrode (7).

(2)

or

Water or hydrogen molecules are produced by this reaction from the hydrogen ions produced by the decomposition on the first electrode (5), the water or hydrogen molecules being released to the air in contact with the second electrode (7). As a result, the moisture contained in the gas in the vessel is removed.

When the moisture in the air is reversely moved to the vessel, i.e., when the gas in the vessel is humidified, the direction of passage of the current is reversed by inverting the polarities of the power source (8) by the voltage controller (9). The reaction of the first electrode (5) (Formula (1)) and the reaction of the second electrode (7) (Formula (2)) are interchanged with each other, resulting in the humidification of the gas in the vessel.

A description will now be made of the operation of the humidity detection portion (3). The humidity of the gas in the vessel is detected by the humidity sensor (10) and converted into an electrical signal which is then transmitted to the voltage controller (9) through the lead wires (11). The voltage controller (9) sets the polarities of the power source on the basis of the electrical signal transmitted thereto in such a manner that, when the humidity of the gas in the vessel is lower than the set value, the gas is humidified. Conversely, when the humidity in the vessel is higher than the set value, the polarities of the power source (8) are so set that the the gas in the vessel is dehumidified. In this way, the humidity controller (1) can control the humidity of the gas in the vessel to a given value.

Figure 19:
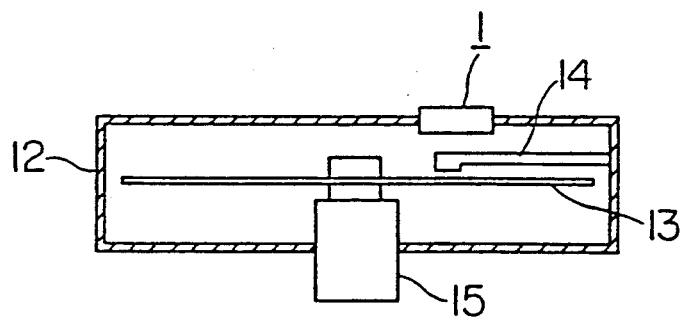
FIG. 19 is a schematic diagram in which the humidity controller of the present invention is applied to a magnetic disk unit.

FIG. 19 is a schematic diagram of the case in which the humidity controller (1) is applied to a magnetic disk unit. In the drawing, a magnetic disk unit (12) contains a magnetic disk (13), a head (14) for writing information in the magnetic disk (13) or reading information therefrom, and a drive (15) for driving the magnetic disk (13). Part of the humidity controller (1) is exposed in the magnetic disk unit (12), and another part of the controller is exposed to the outside of the magnetic disk unit (12).

Figure 20:
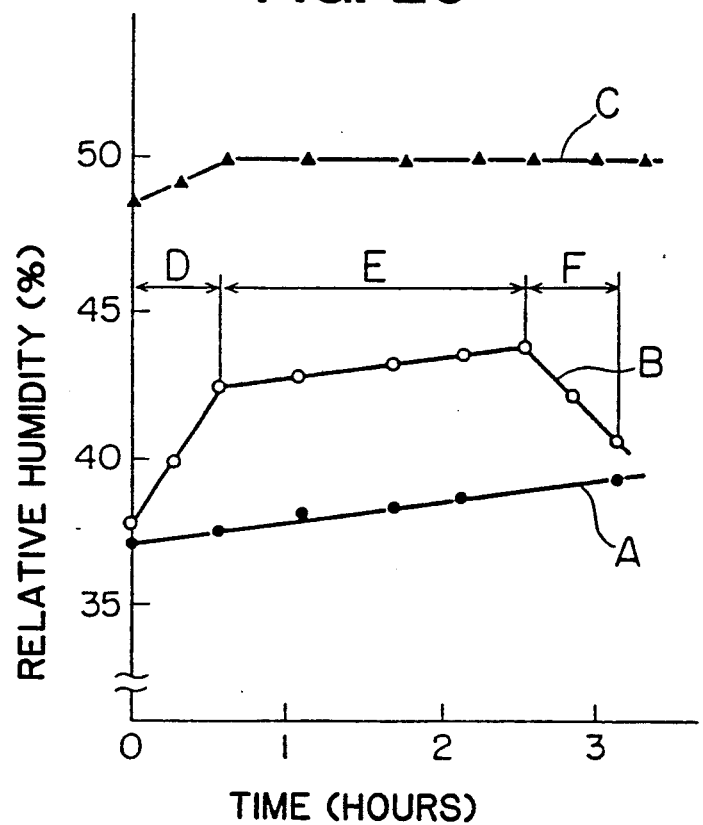
FIG. 20 is a graph showing the states of humidification and dehumidification of the humidity controller provided in the magnetic disk unit shown in FIG. 19.

FIG. 20 is a graph showing the state of humidification and dehumidification at 25° C. by the humidity controller (1) applied to the magnetic disk unit (12) shown in FIG. 19. The humidity in a blank vessel, i.e., the humidity in the magnetic disk unit (12) in which the humidity controller (1) is not provided (shown by A in the drawing) increases at a constant rate due to the permeation entrance of moisture through a packaging caused by a difference in he humidity in the air (shown by C in the drawing) from that in the vessel. On the other hand, the humidity in the magnetic disk unit (12) (shown by B in the drawing) provided with the humidity controller (1) shows the same tendency as that of the humidity in the blank vessel when no current passes through the humidity control element (4) (shown by E in the drawing). In addition, the humidity in the magnetic disk unit (12) provided with the humidity controller (1) can be controlled to be increased (shown by D) or decreased (shown by F) on the basis of the given set value in the voltage controller (9), while the electrical signals from the humidity sensor (10) being fed back to the voltage controller (9).

Although the above-described embodiment uses a polymeric solid electrolyte as the hydrogen ion conductive solid (6), this polymeric solid electrolyte may be formed to a film. For example, Nafion (trade name, produced by Dupon Co., Ltd.) which is an ion exchange membrane can be used. In this case, it is possible to produce a humidity control element (4) having a small value of resistance during the removal of humidity and the resistance to mechanical vibrations.

In addition, although the above-described embodiment concerns the case in which the humidity controller (1) is used for controlling the humidity in the magnetic disk unit, the controller can be widely used in other closed-type vessels.

As described above, this embodiment comprises the humidity control element formed as a unit by laminating the first electrode in contact with the gas containing moisture on one surface thereof, the hydrogen ion conductive solid, and the second electrode in contact with the air on the other surface thereof; the power source which changes the moisture into ions and moves the ions between the two electrodes of the humidity control element; and the humidity sensor which controls the humidity in the gas atmosphere containing moisture to a give value. Therefore, the embodiment can continuously control the humidity of the gas in the vessel to any desired value without being affected by the humidity of the air.

INDUSTRIAL APPLICABILITY

The present invention relates to a dehumidifier which removes moisture in, for example, casings for electronic apparatuses.

We claim:

1. A reversible dehumidifying apparatus for removing moisture from one body of gas and releasing moisture to another body of gas comprising:
    a closed chamber containing a first body of gas;
    a first electrode having first and second surfaces, said first surface being exposed to the first body of gas such that water vapor contained in the first body of gas can readily contact the first surface of the first electrode;
    a second electrode having first and second surface, said second surface of said second electrode being exposed to a second body of gas on the outside of the chamber such that water vapor contained in the second body of gas can readily contact the second surface of the second electrode;
    a proton conductive solid sheet having a first surface contacting the second surface of said first electrode and a second surface contacting the first surface of said second electrode; and
    a DC voltage source connected between the first electrode and the second electrode and providing a substantially constant D.C. voltage differential between said electrodes and across said proton conductive solid sheet.

2. An apparatus according to claim 1 wherein each of said first electrode and said second electrode is a porous electrode.

3. An apparatus according to claim 1 wherein said first electrode, said proton conductive solid, and said second electrode are connected to each other to form a laminate.

4. A dehumidifier according to claim 3 wherein said proton conductive solid comprises $H_3Mo_{12}PO_{40} \cdot 29H_2O$ or $H_3W_{12}PO_{40} \cdot 29H_2O$.

5. An apparatus according to claim 1 wherein said proton conductive solid comprises $H_3Mo_{12}PO_{40} \cdot 29H_2O$ or $H_3W_{12}PO_{40} \cdot 29H_2O$.

6. An apparatus according to claim 1 wherein said DC voltage source includes a photoelectric element electrically connected between said first and second electrodes.

7. An apparatus according to claim 6 comprising a secondary battery connected to receive and store electrical energy generated by said photoelectric element.

8. An apparatus according to claim 7 comprising a plurality of photoelectric elements and a controller connecting said plurality of photoelectric elements in one of (a) in series to boost voltage and increase speed, (b) in parallel to produce extra current to charge said secondary battery, and (c) in a combination of series and parallel.

9. An apparatus according to claim 1 wherein said proton conductive solid is a polymeric solid electrolyte.

10. An apparatus according to claim 1 comprising a humidity sensing element exposed to said first body of gas for sensing the humidity of said first body of gas, and polarity selecting means responsive to said humidity sensing element for selecting the polarity of the voltage differential between said electrodes according to the humidity sensed by said humidity sensing element so as to maintain a predetermined humidity level in one of said bodies of gas.

11. An apparatus according to claim 1 wherein said proton-conductive solid sheet is a non-hygroscopic material.

12. An apparatus according to claim 1 wherein said first and second electrodes comprise a proton electron-mixed conductive solid.

13. An apparatus according to claim 12 wherein said first and second electrodes each comprise a material selected from Pd, $LaNi_5$, and $Ti_3Ni$.

14. An apparatus according to claim 1 wherein the first electrode has a higher potential than the second electrode when the first body of gas is to be dehumidified and has a lower potential than the second electrode when the first body of gas is to be humidified.

15. An apparatus according to claim 14 comprising an inverter circuit connected to said DC voltage source for reversing the polarity of the first and second electrodes so as to control the direction of flow of protons through the proton conductive solid.

16. An apparatus according to claim 1 wherein one of the electrodes comprises first and second portions electrically insulated from one another, the apparatus further comprising:
    a voltage detector connected between the first and second portions for sensing the terminal voltage between the first and second portions; and
    a voltage controller responsive to the voltage detector for controlling the DC voltage source to maintain the terminal voltage at a prescribed value.

17. A dehumidifier comprising:
    a humidity control element comprising a first electrode having first and second surfaces, the first surface being in contact with a gas containing moisture;
    a hydrogen ion conductive solid sheet in contact with the second surface of said first electrode for conducting hydrogen ions produced from the moisture from the second surface of said first electrode;
    a second electrode having a first surface in contact with said hydrogen ion conductive solid for receiving hydrogen ions conducted from the second surface of said first electrode and having a second surface in contact with air containing moisture, the first electrode, the hydrogen ion conductive solid sheet, and the second electrode being formed as a laminate;

a DC voltage source connected between said first electrode and said second electrode for generating a DC voltage;

a voltage detection means connected to said first and said second electrode for detecting a terminal voltage between said two electrodes; and a voltage controller responsive to the voltage detection means for switching the polarity of the electrodes from a first polarity to a second polarity for a prescribed length of time when the terminal voltage exceeds a prescribed level.

18. A dehumidifier according to claim 11 wherein the prescribed length of time is long enough to reduce the terminal voltage to below the prescribed level when the polarity is switched back to the first polarity.

19. A reversible dehumidifier comprising:

a humidity control element comprising a first electrode having a first surface in contact with a first body of gas containing moisture on the first surface thereof and a second surface;

a hydrogen ion conductive solid sheet in contact with the second surface of said first electrode;

a second electrode having a first surface in contact with said hydrogen ion conductive solid and a second surface in contact with a second body of gas containing moisture, the first electrode, the hydrogen ion conductive solid, and the second electrode being formed as a laminate;

a DC voltage source connected between said first electrode and said second electrode;

a humidity sensor disposed in the first body of gas for sensing the humidity in the first body of gas; and a voltage controller responsive to the humidity sensor for controlling the polarity of the voltage generated by the DC voltage source so that the first electrode is maintained positive with respect to the second electrode when the humidity in the first body of gas is above a prescribed level and so that the first electrode is maintained negative with respect to the second electrode when the humidity in the first body of gas is below the prescribed level.

20. A dehumidifier comprising:

a hydrogen ion conductive solid electrolyte sheet;

an electrochemical element comprising a first and second electrode disposed on opposite sides of said hydrogen ion conductive solid electrolyte sheet, one of said first and second electrodes being disposed in contact with a gas having a humidity of which is to be controlled and the other of said first and second electrodes being disposed in contact with air containing moisture;

means for applying a voltage between said first and second electrodes and for causing current to pass through the electrochemical element to control the humidity in the gas; and a display comprising a counter electrode in contact with the gas, a display electrode which changes in appearance in accordance with current passing therethrough, an ion-conductive electrolyte disposed between and in contact with the counter electrode and the display electrode, and means for supplying to the counter electrode and the display electrode a current corresponding to the current passing between the first and second electrodes of the electrochemical element.

21. A dehumidifier according to claim 13 wherein the display electrode comprises an electrode having a color determined by the direction of a current flowing therethrough.

22. A dehumidifier according to claim 13 wherein the display electrode comprises an electrochemical integrator.

23. A dehumidifier for removing moisture from a gas in a closed container comprising:

a laminate comprising a first electrode, a second electrode, and a sheet of hydrogen ion conductive material sandwiched between the first and second electrodes, the first and second electrodes each having an inner surface facing the sheet of hydrogen ion conductive material and an outer surface, the closed container having an aperture, the outer surface of the first electrode being in contact with the gas containing moisture inside the container and the outer surface of the second electrode being in contact with air containing moisture;

a DC voltage source connected to supply a voltage of a first polarity between the first and second electrodes to cause hydrogen ions to flow from the first electrode to the second electrode;

a polarity-changing switch connected to said voltage source to switch the voltage supplied to the first and second electrodes between the first polarity and a second polarity which causes hydrogen ions to flow from the second electrode to the first electrode; and switch operating means for operating said polarity-changing switch to cause said voltage source to supply voltage of the first polarity for a first period of time and voltage of the second polarity for a second period of time shorter than the first period of time.

24. A dehumidifier according to claim 16 wherein the second period of time is long enough to remove nonuniform concentrations of hydrogen ions in the hydrogen ion conductive material which developed during the first period of time.

25. A dehumidifier according to claim 16 comprising voltage sensing means for sensing the terminal voltage of the first and second electrodes, wherein the switch operating means switches from the first polarity to the second polarity when the voltage sensing means senses that the terminal voltage exceeds a prescribed level.

26. A dehumidifier according to claim 25 wherein the second period of time is long enough to reduce the terminal voltage to below the prescribed level when the polarity is switched back to the first polarity.

27. A method for operating an electrolytic dehumidifier having first and second electrodes and a hydrogen ion conductive solid sheet disposed in contact with the first and second electrodes comprising:

placing the first electrode in contact with a first gas to be dehumidified and the second electrode in contact with a second gas containing moisture;

applying a DC voltage of a first polarity to the first electrode and the second electrode for a first period of time, the first polarity being such that the first electrode is at a higher voltage than the second electrode; and applying a DC voltage of a second polarity to the first electrode and the second electrode for a second period of time shorter than the first period of time, the second polarity being the opposite of the first polarity.

28. A method according to claim 17 wherein the second period of time is long enough to remove nonuniform concentrations of hydrogen ions in the hydrogen ion conductive material which developed during the first period of time.

29. A method according to claim 17 comprising sensing the terminal voltage of the first and second electrodes and applying the voltage of the second polarity when the terminal voltage exceeds a prescribed level.

30. A method according to claim 29 wherein the second period is long enough to reduce the terminal voltage to below the prescribed level when the polarity of the voltage applied to the electrodes is switched back to the first polarity.

* * * * *

UNITED STATES PATENT AND TRADEMARK OFFICE
CERTIFICATE OF CORRECTION

PATENT NO. : 5,096,549
DATED : March 17, 1992
INVENTOR(S) : Yamachi et al

It is certified that error appears in the above-indentified patent and that said Letters Patent is hereby corrected as shown below:

On the title page: Item [22] should read  --filed July 13, 1990 --.
Item 86 & 87 should be deleted and insert Item [63]
   Continuation of Serial No. 296,057, January 6, 1989, abandoned --.

Signed and Sealed this

Twenty-eighth Day of December, 1993

Attest:

BRUCE LEHMAN

*Attesting Officer*          *Commissioner of Patents and Trademarks*